Dec. 16, 1958 O. BORUVKA 2,864,163
BARBECUE FORK
Filed July 18, 1957 2 Sheets-Sheet 1
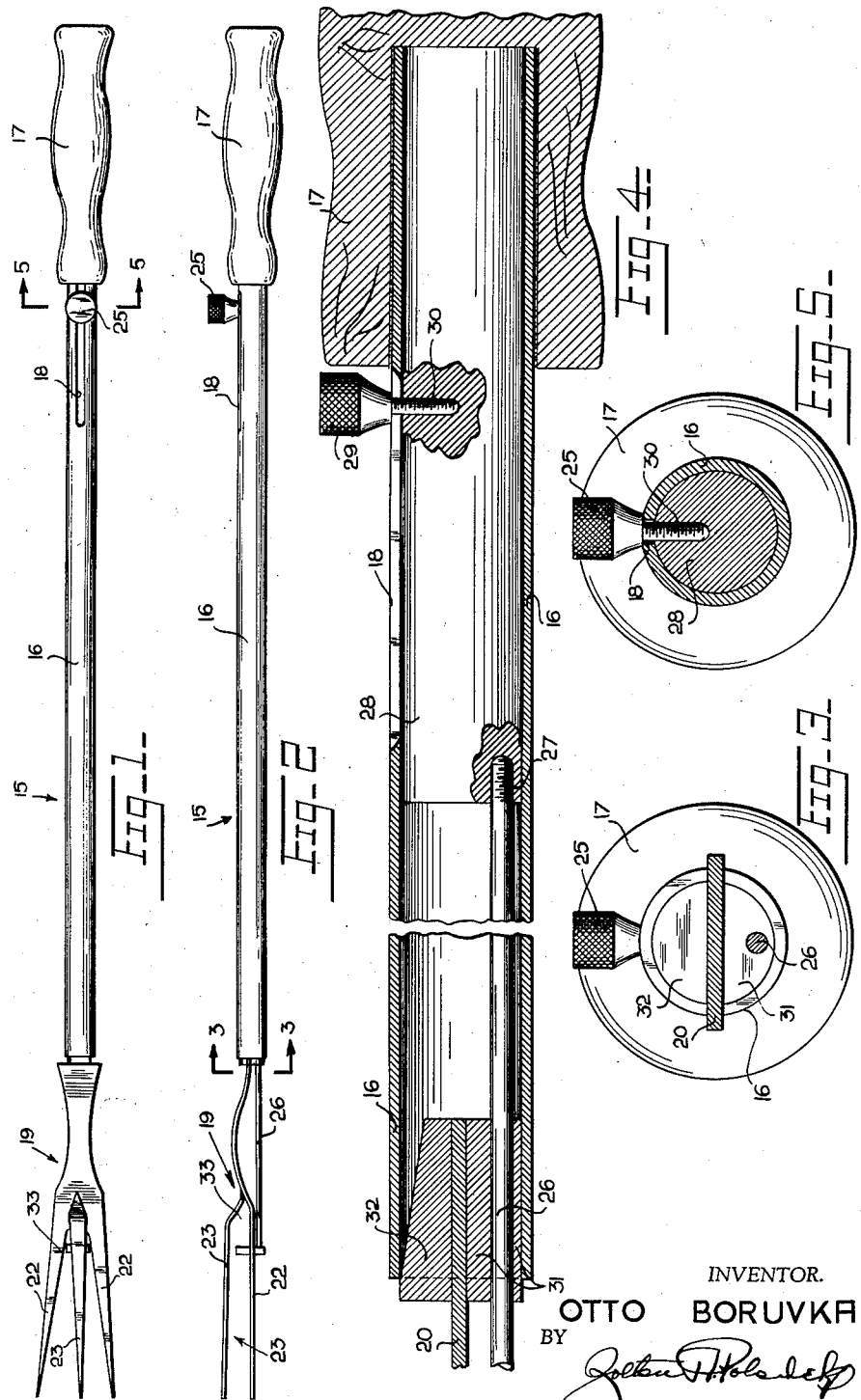
INVENTOR.
OTTO BORUVKA
BY
ATTORNEY Dec. 16, 1958  O. BORUVKA  2,864,163
BARBECUE FORK
Filed July 18, 1957  2 Sheets-Sheet 2
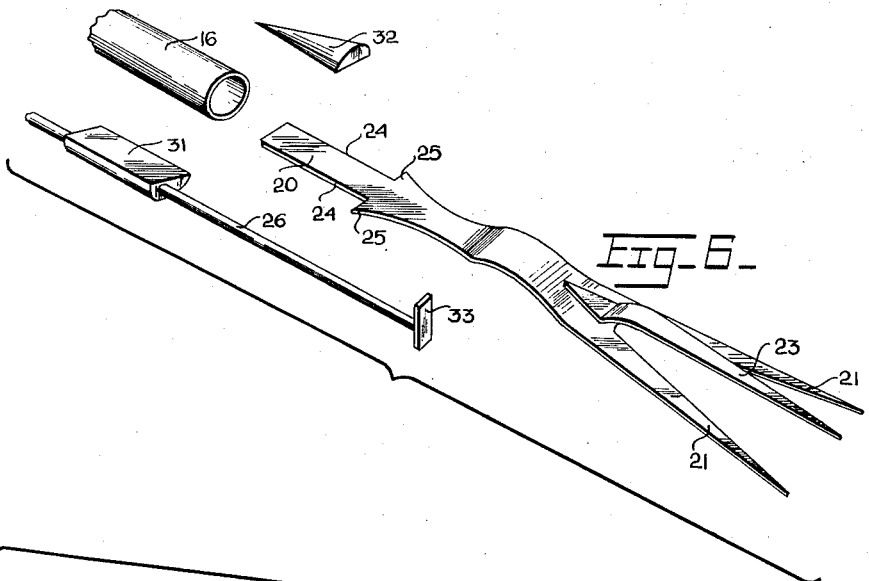
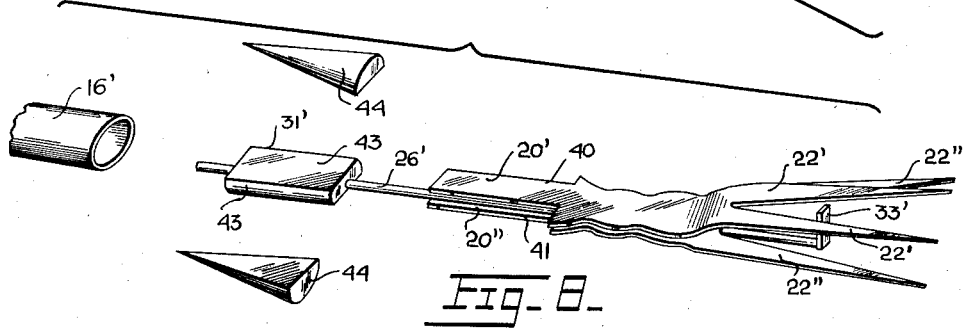
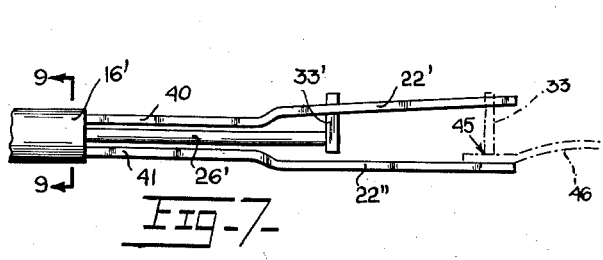
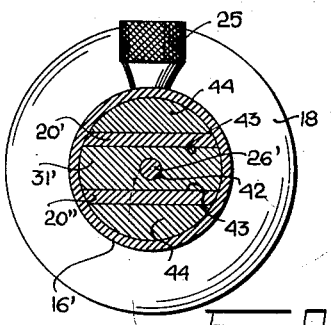
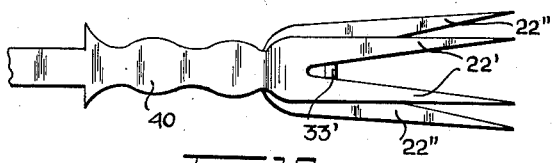
INVENTOR.
OTTO BORUVKA
BY
ATTORNEY

United States Patent Office 2,864,163
    Patented Dec. 16, 1958

2,864,163

BARBECUE FORK

Otto Boruvka, New York, N. Y.

Application July 18, 1957, Serial No. 672,610

4 Claims. (Cl. 30—129)

This invention relates to forks and, more particularly, to a serving fork particularly designed for use as a table or kitchen tool and which is equipped with a stripper for dislodging food from the tines of the fork.

While various attempts have heretofore been made to provide forks with ejecting devices, so far as is known, no entirely satisfactory device of this kind has as yet come into general use. In many cases the proposed ejector devices are guided along the tines by interlocking the devices with the tines. It is clearly evident that the freedom of movement of such ejector members depends to a large extent upon the degree to which those tines with which it engages approach substantial parallelism, and that the bending of one or more of such tines may render the device entirely inoperative. Such bending of fork tines, particularly the outside tines, where three or more are employed, is of frequent occurrence in culinary use. An important object of the present invention, therefore, is to so design and construct an ejector device that its freedom of movement will be but little impaired by any ordinary bending of the tines of the fork. To this end, it is proposed to form the ejector as a substantial flat plate movable through the space between the tines, interlocked with none of the tines, but movable sufficiently close thereto to insure the ejection of food of substantial size impaled on the tines.

Another object of the invention is to provide a fork with an ejector device of light weight and of simple and inexpensive construction and which at the same time shall be well adapted for its intended use.

A further object of the invention is to provide a fork with an ejector device that is practically frictionless in operation, is positioned adjacent the handle in order to be easily operated by the thumb when the hand grasps the handle of the fork.

It is also proposed to provide a fork with a device capable of stripping the tines of food and of lifting pot covers, plates, articles of food and the like.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view of a fork embodying one form of my invention.

Fig. 2 is a side elevational view thereof.

Fig. 3 is an enlarged cross-sectional view taken on the plane of the line 3—3 of Fig. 2.

Fig. 4 is an enlarged fragmentary sectional view taken through the center of the fork, parts being broken away.

Fig. 5 is an enlarged cross-sectional view taken on the plane of the line 5—5 of Fig. 1.

Fig. 6 is an exploded perspective view of the fork.

Fig. 7 is an enlarged fragmentary side elevational view of a modified form of fork.

Fig. 8 is an exploded perspective view of the fork of Fig. 7.

Fig. 9 is an enlarged cross-sectional view taken on the plane of the line 9—9 of Fig. 7.

Fig. 10 is a top plan view of the tines of the form shown in Fig. 7.

Referring to the drawings in detail and particularly to Figs. 1 to 6, inclusive, a fork made in accordance with the first form of the invention is indicated generally at 15. This fork comprises an elongated tubular shank 16 of stainless steel provided at one end with a wooden handle 17. An elongated slot 18 is formed in the shank 16 adjacent the handle.

The fork proper 19 is preferably formed of flat sheet metal of any desired kind of the shape indicated, the thickness of the metal being sufficient to give the fork a desirable degree of stiffness. The fork comprises a flat shank 20 and three tines on one end thereof, two tines 22, 22 being disposed in the same plane, and the third tine 23 being disposed in another plane, all of the tines being offset from the plane of the shank 20 and providing a space 23 between the tines. The shank 20 is provided with substantially parallel edges as indicated at 24, 24, terminating in shoulders 25, 25 having a transverse length greater than the diameter of shank 16.

The stripper or ejector comprises a rod 26 slidably mounted in the tubular shank 16 and threaded at its inner end into a threaded socket opening 27 formed in the end of a metal rod 28 slidably fitted in the end of the shank 16 at the handle. A thumb piece in the form of a headed screw 29 is threaded into a radially extending threaded socket opening 30 in the metal rod 28, the shank of the screw being slidable along the elongated slot 18 and the head being disposed radially outside the tubular shank for sliding the rod 26 therethrough. The other end of the rod 26 projects outwardly of the other end of the tubular shank 16 and extends through an opening in a semicylindrical bearing block 31 fitted in the end of the tubular shank 16 between said shank and the shank portion 20 of the fork. A wedge-shaped plug 32 is wedged between the other side of the shank of the fork and the tubular shank 16 for securing the fork in position. A plate 33 is suitably fastened to the outer end of the rod 26 by welding, soldering or in any other suitable manner and is disposed between the tines 22, 22 and 23 with its long axis extending perpendicularly to the plane of the tines 22, 22. The dimensions of the plate 33 are such that it is closely spaced away from the tines but moves sufficiently close thereto to dislodge any food that might be impaled thereon.

In use, the handle is grasped by the hand and the thumb is used to draw back the thumb piece 29 to withdraw the stripper or ejector device to the rear of the fork. When an article of food or the like on the tines is to be removed, the fork need not be shaken but the thumb piece is simply pushed from the handle and the stripper or ejector removes the article from the tines.

In the modified form of fork shown in Figs. 7 to 10, inclusive, a pair of fork members 40 and 41 are provided instead of a single fork member 19 as in the form of Figs. 1 to 6, inclusive. Fork member 40 has two closely spaced tines 22', 22' and fork member 41 has two widely spaced tines 22", 22". The slidable rod 26' extends through an opening 42 in a bearing block 31' having opposed flat sides 43, 43. The shank portion 20' of fork member 40 is placed on one flat side 43 and the shank portion 20" of fork member 41 on the opposite flat side thereof. Wedge-shaped plugs 44 wedge the shank portions between the bearing block and the tubular shank 16'. In this form of fork, the wider tines 22", 22" diverge slightly away from the other tines 21', 21' so that when the ejector plate 33' is in its outermost position as shown in dot-dash lines in Fig. 7, there is a space indicated at 45 between the lower end of the plate and the wider tines 22", 22".

This form of the invention is used similarly to the form of Figs. 1 to 6, inclusive, the plate 33' moving sufficiently close to the tines to dislodge any food thereon. In addition, the wider tines 22", 22" may be placed under the peripheral edge of a cover of a pot, such as indicated at 46 in Fig. 7, or under a plate, a strip of food, or the like, and the plate 33' drawn rearwardly thereover whereby the edge of the plate will clamp the peripheral edge against the tines 22", 22" so that the clamped device may be lifted off its supporting surface.

In all other respects, the form shown in Figs. 7 to 10, inclusive, is similar to the form shown in Figs. 1 to 6, inclusive, and similar reference numerals are used to indicate similar parts.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patents, is:

1. A fork having a flat shank with tines offset from the plane thereof, one end of said shank having substantially parallel edges terminating in shoulders, a tubular shank, said shoulders having a transverse length greater than the diameter of said tubular shank, said one end of the flat shank being inserted in one end of the tubular shank with the tines extending forwardly therefrom, a first rod slidably fitted in the tubular shank, said rod having a threaded socket at one end, said tubular shank having an elongated slot therein, a screw threaded radially into said rod through said slot and having a head extending radially from said tubular shank, another rod having one end threaded in said socket and extending forwardly beyond said one end of the tubular shank, a bearing block disposed in said one end of the tubular shank, said block having a passage extending therethrough with said other rod slidably fitted in said passage, said block having a flat side disposed diametrically across said other end of the tubular shank, said flat shank being juxtaposed to said flat side of the block, a wedge-shaped plug secured in said other end of the block against said flat shank and holding the flat shank and bearing block in the tubular shank, and a plate secured to the outer forward end of said other rod and movable along and between said tines by slidable movement of said other rod in said bearing block and slidable movement of the first rod in said tubular shank.

2. A fork according to claim 1, wherein said bearing block is semicylindrical in shape.

3. A fork according to claim 1, further comprising another flat shank having one end formed with substantially parallel edges terminating in shoulders, said other flat shank having other tines offset from the plane thereof, said one end of the flat shank being inserted in said one end of the tubular shank with the tines thereof extending forwardly and spaced from the tines of the first named flat shank, said bearing block having another flat side, said other flat shank being juxtaposed to said other flat side of the block in the tubular shank, and another wedge-shaped plug secured in said other end of the tubular shank against said other flat shank.

4. A fork according to claim 2, wherein the tines of the flat shank flare outwardly, with the tines of said other flat shank flaring outwardly more than the tines of the first named flat shank.

References Cited in the file of this patent

UNITED STATES PATENTS

| D. 28,444 | Richardson | Apr. 5, 1898 |
| 1,801,084 | Huie | Apr. 14, 1931 |
| 2,262,540 | Stone | Nov. 11, 1941 |
| 2,521,032 | Becker | Sept. 5, 1950 |

FOREIGN PATENTS

| 517,478 | Canada | Oct. 18, 1955 |